(12) United States Patent
Webb

(10) Patent No.: US 6,607,014 B2
(45) Date of Patent: Aug. 19, 2003

(54) FUEL FILLING SYSTEM

(76) Inventor: Anthony Keith Webb, The Bay House, Manor Park Orchan, Douglas, Isle of Man (GB)

( * ) Notice: Subject to any disclaimer, the term of this patent is extended or adjusted under 35 U.S.C. 154(b) by 0 days.

(21) Appl. No.: 10/058,111

(22) Filed: Jan. 29, 2002

(65) Prior Publication Data

US 2002/0170622 A1 Nov. 21, 2002

(30) Foreign Application Priority Data

May 16, 2001 (GB) .............................................. 0111946

(51) Int. Cl.⁷ .............................................. B60K 15/04
(52) U.S. Cl. ........................ 141/367; 141/382; 141/392; 220/86.2
(58) Field of Search ................................ 141/312, 367, 141/382, 392; 220/86.2

(56) References Cited

U.S. PATENT DOCUMENTS

| 4,150,673 | A | * | 4/1979 | Watt ............................. 604/408 |
| 4,638,919 | A | | 1/1987 | Feenick |

FOREIGN PATENT DOCUMENTS

| GB | 2 287 700 | * | 9/1995 |
| GB | 2 290 287 | * | 12/1995 |

* cited by examiner

Primary Examiner—J. Casimer Jacyna
(74) Attorney, Agent, or Firm—Young & Thompson

(57) ABSTRACT

A fuel filling system includes a diesel fuel filler orifice on the vehicle for receiving diesel fuel from a diesel fuel supply nozzle. The diesel fuel filler orifice is of non-circular cross-section and has a minimum internal dimension which is less than the external diameter of a traditional lead free fuel pump nozzle. A diesel fuel supply nozzle is also disclosed. This supply nozzle has a maximum external dimension greater than the internal diameter of a traditional leaded fuel filler orifice.

10 Claims, 1 Drawing Sheet

10

Prior Art

11

Prior Art

Mi

12

Ma

FUEL FILLING SYSTEM

BACKGROUND

This invention relates to a fuel filling system for diesel powered vehicles.

Internal combustion engines are powered by three main fuels. These are petroleum fuel in leaded or unleaded form (hereinafter referred to as leaded and lead free fuel respectively), and diesel fuel.

Petrol is dispensed from forecourt pumps having nozzles of circular cross-section and into filler orifices on vehicles also of circular cross-section. The filler orifice on vehicles powered by lead free fuel are of smaller diameter than the filler orifices of vehicles powered by leaded fuel. The nozzles of forecourt pumps dispensing lead free fuel are of smaller diameter than the nozzles of forecourt pumps dispensing leaded fuel. The nozzles of forecourt pumps dispensing leaded fuel are of greater external diameter than the internal diameter of the filler orifices on vehicles powered by lead free fuel so that the leaded fuel supply nozzles do not fit into the filler orifices of vehicles powered by lead free fuel.

Diesel fuel is also dispensed through nozzles of circular cross-section and into filler orifices also of circular cross-section. The size of the filler orifice of diesel powered vehicles permits the entry of both leaded and lead free fuel supply nozzles. This is a frequent cause of problems, particularly with drivers unused to diesel powered vehicles as they can fill their vehicles with petrol through ignorance or carelessness. The reverse also happens with diesel being put into petrol powered vehicles. This results in an expensive and time-consuming operation to remove the fuel and purge the system. The operation may involve more than 50 liters of volatile petrol with a degree of risk involved in the workplace.

The present invention seeks to overcome the aforementioned drawback.

SUMMARY OF THE INVENTION

According to the present invention there is provided a fuel filling system for diesel powered vehicles, comprising a diesel fuel filler orifice on the vehicle for receiving diesel fuel from a diesel fuel supply nozzle, the diesel fuel filler orifice being of non-circular cross-section and having a minimum internal dimension which is less than the external diameter of a traditional lead free fuel pump nozzle.

Preferred and/or optional features of the invention are set forth in claims 2 to 9.

The invention will now be more particularly described, by way of example, with reference to the accompanying drawings.

DESCRIPTION OF THE PREFERRED EMBODIMENT

Figure 1:
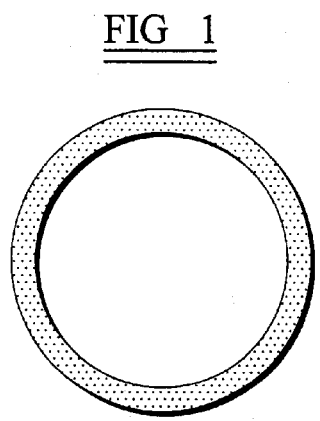
FIG. 1 is a schematic end view of a traditional nozzle of a forecourt pump dispensing lead free fuel.

FIG. 1 shows a traditional lead free fuel nozzle 10 of a garage forecourt pump. This has an external diameter of approximately 19 mm. It is designed to fit into a filler orifice of a vehicle powered by lead free fuel (petrol) having an internal diameter slightly larger than the external diameter of the nozzle 10.

Figure 2:
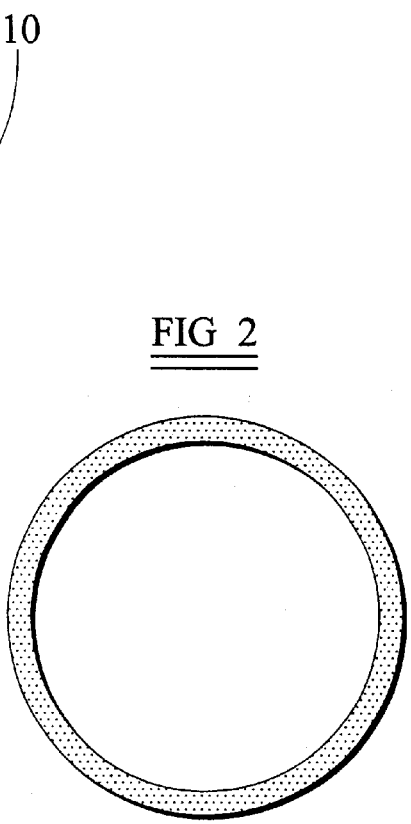
FIG. 2 is a schematic end view of a traditional nozzle of a forecourt pump dispensing leaded fuel.

FIG. 2 shows a traditional leaded fuel nozzle 11 of a garage forecourt pump. This has an external diameter of approximately 25 mm. This is designed to fit into a filler orifice of a vehicle powered by leaded fuel (petrol) having an internal diameter larger than the external diameter of the nozzle 11. The nozzle 11 will not fit into the filler orifice of a vehicle powered by lead free fuel.

Figure 3:
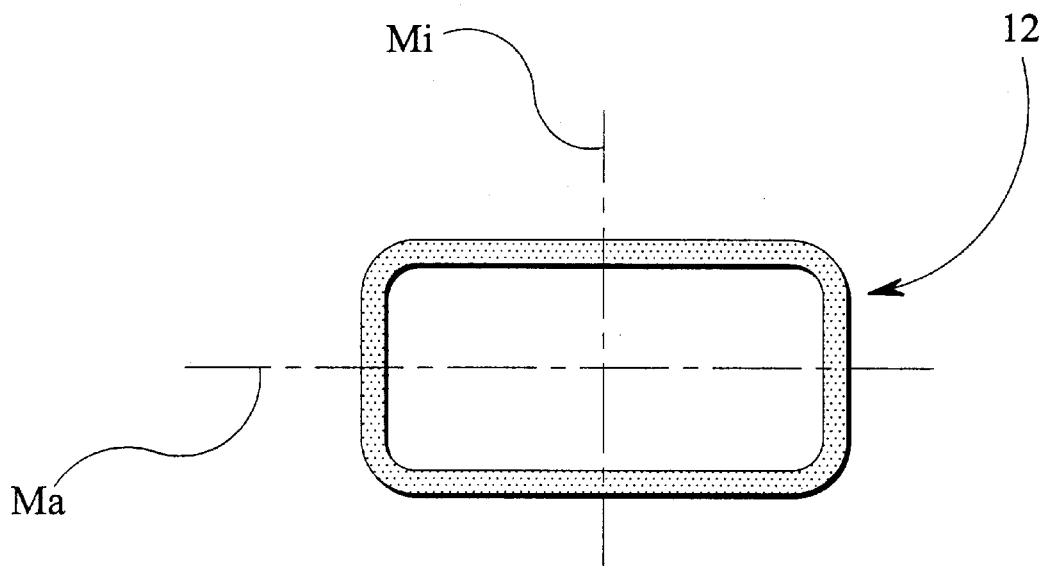
FIG. 3 is a schematic end view of one embodiment of a filler orifice according to the present invention.

FIG. 3 shows one embodiment of a filler orifice 12 according to the present invention. The orifice 12 is of substantially rectangular shape but with rounded corners. It has a major axis Ma and a minor axis Mi which is perpendicular to the major axis Ma. It is symmetrical about both the major axis Ma and the minor axis Mi. The orifice 12 is designed to be fitted to diesel powered vehicles and the internal width, as measured in a direction parallel to the minor axis Mi, is less than the external diameter of a traditional lead free fuel pump nozzle such as the nozzle 10 shown in FIG. 1.

The filler orifice 12 is intended to receive a diesel fuel supply nozzle (not shown) having a matching or substantially matching shape and having an external major dimension, as measured in a direction parallel to the major axis of the nozzle, which is greater than the internal diameter of a traditional leaded fuel orifice.

A fuel filling system comprising the orifice 12 and a nozzle of matching or substantially matching shape will prevent or at least deter a user from dispensing lead free or leaded petrol into the filler orifice 12 of a diesel powered vehicle. It will also prevent or deter a user dispensing diesel fuel into a vehicle powered by leaded or lead free petrol.

The embodiments described above are given by way of example only and various modifications will be apparent to persons skilled in the art without departing from the scope of the invention as defined by the appended claims. For example, the orifices and nozzles could be of rectangular shape without rounded corners. They could be of other non-circular shapes and for example could be of elliptical or oval shape.

What I claim is:

1. A fuel filling system for diesel powered vehicles, comprising a diesel fuel filler orifice on the vehicle for receiving diesel fuel from a diesel fuel supply nozzle, the diesel fuel filler orifice being of non-circular cross-section and having a minimum internal dimension which is less than the external diameter of a traditional lead free fuel pump nozzle.

2. A fuel filling system as claimed in claim 1, wherein the diesel fuel filler orifice has a major axis and a minor axis perpendicular to the major axis, and wherein the internal dimension of the diesel fuel filler orifice as measured in a direction parallel to its minor axis is less than the external diameter of a traditional lead free fuel pump nozzle over the entire or substantially the entire length of the diesel fuel filler orifice.

3. A fuel filling system as claimed in claim 2, wherein the diesel fuel filler orifice is symmetrical or substantially symmetrical about both its major and minor axes.

4. A fuel filling system as claimed in claim 1, wherein the diesel fuel filling orifice is of rectangular or substantially rectangular cross-section.

5. A fuel filling system as claimed in claim 1, wherein the diesel fuel filling orifice is of substantially rectangular cross-section with rounded corners.

6. A fuel filling system as claimed in claim 1, further comprising a diesel fuel supply nozzle having a maximum external dimension greater than the internal diameter of a traditional leaded fuel filler orifice.

7. A fuel filling system as claimed in claim 6, wherein the diesel fuel supply nozzle and the diesel fuel filler orifice are of matching or substantially matching shape.

8. A fuel filling system as claimed in claim 6, wherein the diesel fuel supply nozzle is a garage forecourt pump nozzle.

9. A fuel filling system as claimed in claim 6, wherein the diesel fuel supply nozzle is on a portable container.

10. The fuel filling system of claim 1, wherein the diesel fuel filter orifice has a minimum internal dimension less than approximately 19 mm.

* * * * *